(12) United States Patent
Kamiyama et al.

(10) Patent No.: US 7,311,121 B2
(45) Date of Patent: Dec. 25, 2007

(54) LATERAL PIPE LINING MATERIAL AND LATERAL PIPE LINING METHOD

(75) Inventors: Takao Kamiyama, Hiratsuka (JP); Koji Kaneta, Hiratsuka (JP); Kenji Fuji, Hiratsuka (JP)

(73) Assignee: Shonan Gosei-jushi Seisakusho K.K., Kanagawa-ken (JP)

( * ) Notice: Subject to any disclaimer, the term of this patent is extended or adjusted under 35 U.S.C. 154(b) by 81 days.

(21) Appl. No.: 11/261,167

(22) Filed: Oct. 27, 2005

(65) Prior Publication Data

US 2006/0130922 A1     Jun. 22, 2006

Related U.S. Application Data

(60) Provisional application No. 60/623,093, filed on Oct. 27, 2004.

(51) Int. Cl.
*F16L 55/16* (2006.01)

(52) U.S. Cl. .............. 138/98; 138/97; 405/150.1; 405/184.2; 264/267; 264/269; 156/287; 156/294

(58) Field of Classification Search ............ 138/98, 138/97; 450/150.1, 184.1, 184.2, 157; 264/267, 264/269, 516
See application file for complete search history.

(56) References Cited

U.S. PATENT DOCUMENTS

| | | | |
|---|---|---|---|
| 4,680,066 A * | 7/1987 | Wood | 156/156 |
| 5,356,502 A | 10/1994 | Kamiyama et al. | 156/267 |
| 5,388,616 A * | 2/1995 | Muller et al. | 138/98 |
| 5,439,033 A | 8/1995 | Kamiyama et al. | 138/98 |
| 5,454,401 A | 10/1995 | Kamiyama et al. | 138/98 |
| 5,566,719 A | 10/1996 | Kamiyama et al. | 138/98 |
| 5,598,873 A | 2/1997 | Kamiyama et al. | 138/98 |
| 5,950,682 A * | 9/1999 | Kiest, Jr. | 138/98 |
| 6,152,184 A | 11/2000 | Kamiyama et al. | 138/98 |
| 6,227,764 B1 * | 5/2001 | Einhaus et al. | 405/157 |
| 6,899,832 B2 * | 5/2005 | Wood | 264/36.17 |

* cited by examiner

*Primary Examiner*—Patrick F. Brinson
(74) *Attorney, Agent, or Firm*—Klarquist Sparkman, LLP

(57) ABSTRACT

A lateral pipe lining material comprises a tubular resin absorbing material impregnated with a setting resin, which has a flange at one end thereof and whose outer surface is coated with a highly airtight film. A sealing tube is detachably attached to the outer circumferential surface of the tubular resin absorbing material. The lateral pipe lining material is introduced inside a main pipe and its flange is brought into tight contact with the lateral pipe opening. The lateral pipe lining material including the sealing tube is then everted and inserted by fluid pressure inside a lateral pipe toward the ground level. After the setting resin is cured, the sealing tube is removed from the lateral pipe lining material. This enables the lining of a lateral pipe to always be performed reliably, regardless of the aboveground circumstances.

3 Claims, 8 Drawing Sheets

LATERAL PIPE LINING MATERIAL AND LATERAL PIPE LINING METHOD

CROSS REFERENCE TO RELATED APPLICATION

This application claims the benefit of corresponding U.S. Provisional application No. 60/623,093, filed on Oct. 27, 2004, which is incorporated herein by reference.

BACKGROUND OF THE INVENTION

1. Field of the Invention

The present invention relates to a lateral pipe lining material that serves as a lining of a lateral pipe that branches from a main pipe, and a lateral pipe lining method that uses such.

2. Description of the Prior Art

A pipe lining method is known that, when a pipeline such as a sewer pipe buried underground has deteriorated, repairs the pipeline by lining its inner circumferential surface without digging up the pipeline.

Namely, the abovementioned pipe lining method is able to line the inner circumferential surface of the pipeline by: using fluid pressure to insert, while everting, a pipe lining material inside a pipeline, wherein the pipe lining material is made of a flexible tubular resin absorbing material impregnated with a setting resin and whose outer circumferential surface is coated with a highly air-tight film; pressing the pipe lining material against the pipeline inner circumferential surface; and, while maintaining that state, curing the setting resin impregnated in the pipe lining material by means such as heating the pipe lining material.

Incidentally, the abovementioned method can also be applied to a lateral pipe that branches from a main pipe, and FIG. 8 shows such an example.

FIG. 8 is a cross sectional view that shows a conventional lateral pipe lining method, wherein a setting nozzle 115 is supported by a working robot 112 introduced inside a main pipe 130, a pressure bag 113 for eversion is attached to the setting nozzle 115, and a flange 103 formed on one end of a lateral pipe lining material 101 installed inside the pressure bag 113 is folded on the outer side, and set onto the setting nozzle 115.

The setting nozzle 115 is then moved upward by driving the working robot 112, and the flange 103 of the lateral pipe lining material 101 set thereon is brought into tight contact with the lateral pipe opening part circumferential edge of the main pipe 130, as shown in the figure. Compressed air is then supplied into the pressure bag 113 via an air hose 124 by, for example, driving a compressor (not shown). This causes the lateral pipe lining material 101 to receive the pressure of the compressed air and to be successively inserted from the main pipe 130 into the lateral pipe 131 toward the ground level (upper direction) while being everted.

When the eversion and insertion of the lateral pipe lining material 101 into the lateral pipe 131 is completed across its entire length, as shown in the figure, the lateral pipe lining material 101 is kept to be pressed against the inner circumferential surface of the lateral pipe 131 by an arbitrary method, and the thermosetting resin impregnated in the lateral pipe lining material 101 is cured by heating, and the like. The inner circumferential surface of the lateral pipe 131 is thus lined and repaired by the cured lateral pipe lining material 101.

When the curing of the lateral pipe lining material 101 is finished, the everted end portion of the lateral pipe lining material 101 protruding from a box 131a open to the ground level is cut off, and the working robot 112 is removed from the main pipe 130 along with the pressure bag 113, thereby completing the sequence of the lateral pipe lining work.

Nonetheless, depending on the circumstances of the aboveground surroundings where the box 131a is installed, there are cases where it may not necessarily be possible to perform the work of cutting off the everted end portion protruding from the box 131a of the lateral pipe lining material 101. In such a case, there is a problem in that the abovementioned construction method cannot be applied, as is, to the lateral pipe 131.

Therefore, to solve this problem, a construction method that does not require the work of cutting off the everted end of the lateral pipe lining material on the aboveground side has been proposed in Japanese Published Patent Application No. 1996-164560, wherein a peel off tube is bonded to the outer circumference of the tubular resin absorbing material in the vicinity of the flange, the setting resin impregnated in the lateral pipe lining material is cured, and the peel off tube is then peeled off and removed.

Nevertheless, with a conventional lateral pipe lining material to which a peel off tube is bonded, that peel off tube is attached only to one end part of the lateral pipe lining material, which does not achieve a sufficient effect. In addition, because the peel off tube is rigidly attached to the lateral pipe lining material, there are problems such as the lateral pipe lining being partially damaged by the peeling.

It is therefore an object of the invention to provide a lateral pipe lining material and a lateral pipe lining method that enables lining of a lateral pipe up to an arbitrary pipeline length, regardless of the aboveground circumstances.

SUMMARY OF THE INVENTION

According to the present invention, a lateral pipe lining material comprises a tubular resin absorbing material impregnated with a setting resin, which has a flange at one end thereof and whose outer surface is coated with a highly airtight film, and a sealing tube detachably attached to the outer circumferential surface of said tubular resin absorbing material.

The sealing tube is longer than the overall length of the tubular resin absorbing material, one end of the sealing tube on the side opposite the flange of the tubular resin absorbing material is closed (sealed), and the other end thereof on the flange side is open extending longer than the flange and forming an opening end. The opening end of the sealing tube is attached to a pressure bag for everting the entire lateral pipe lining material and the sealing tube.

A method according to the invention for lining a lateral pipe uses a lateral pipe lining material made of a tubular resin absorbing material impregnated with a setting resin, which has a flange at one end thereof and whose outer surface is coated with a highly airtight film, and comprises the steps of: detachably attaching a sealing tube to an outer circumferential surface of said tubular resin absorbing material; introducing inside a main pipe said lateral pipe lining material with the sealing tube detachably attached to said tubular resin absorbing material; bringing the flange of said lateral pipe lining material into tight contact with a lateral pipe opening at the main pipe; inserting, while everting, the lateral pipe lining material by fluid pressure inside the lateral pipe from the main pipe toward the ground level; curing the setting resin impregnated in the lateral pipe lining material, while maintaining a state wherein it is pressed against the inner circumferential surface of the lateral pipe; and removing said sealing tube from the lateral pipe lining material after the curing is completed.

According to the present invention, the sealing tube is everted by everting the lateral pipe lining material, and therefore the everted sealing tube forms a sealed space, and the entire tubular resin absorbing material can be effectively pressed against the lateral pipe via the sealing tube. In addition, because it is no longer necessary to perform the work of cutting off the closed portion of the sealing tube after eversion, it is always possible to reliably line the lateral pipe, regardless of the aboveground circumstances.

Further features of the invention, its nature and various advantages will be more apparent from the accompanying drawings and following detailed description of the invention.

DESCRIPTION OF THE PREFERRED EMBODIMENTS

The present invention enables the lining of a lateral pipe up to an arbitrary pipeline length, regardless of the aboveground circumstances, and the present invention will now be explained based on the embodiments shown in the attached drawings.

Figure 1:
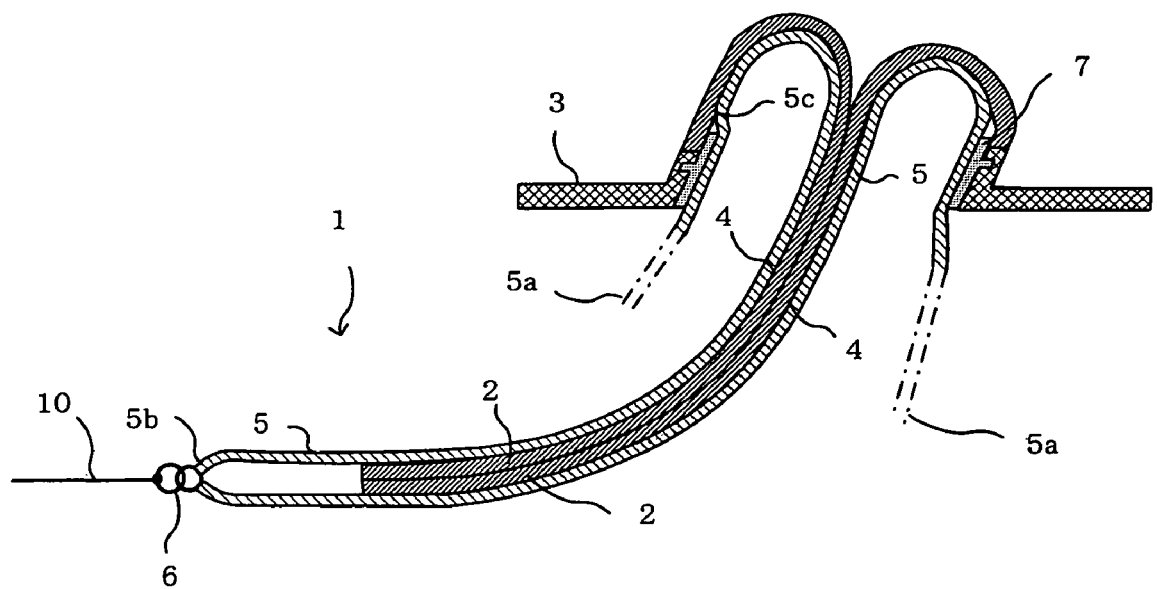
FIG. 1 is a cross sectional view of the lateral pipe lining material according to the present invention.

FIG. 1 is a cross sectional view of the lateral pipe lining material according to the present invention. A lateral pipe lining material 1 shown in FIG. 1 comprises a tubular resin absorbing material 2 made of a nonwoven fabric whose one end is folded outwardly to form a flange 3. The portion excluding the flange 3 of the tubular resin absorbing material 2 is impregnated with an uncured liquid thermosetting resin, and a highly airtight plastic film 4 is coated on the outer surface (the outer circumferential surface) of that portion. Polyester, polypropylene, nylon, acrylic, vinylon, or the like, is selected as the nonwoven material that constitutes the tubular resin absorbing material 2, and unsaturated polyester resin, epoxy resin, or the like, is used as the thermosetting resin impregnated therewith. Polyurethane, polyethylene, polyethylene/nylon copolymer, vinyl chloride, or the like, is selected as the material of the abovementioned plastic film 4.

Note that the inner surface (the inner circumferential surface) of the portion excluding the flange 3 of the tubular resin absorbing material 2 of the lateral pipe lining material 1 can also be coated with a film, the same as the plastic film 4.

Figure 2:
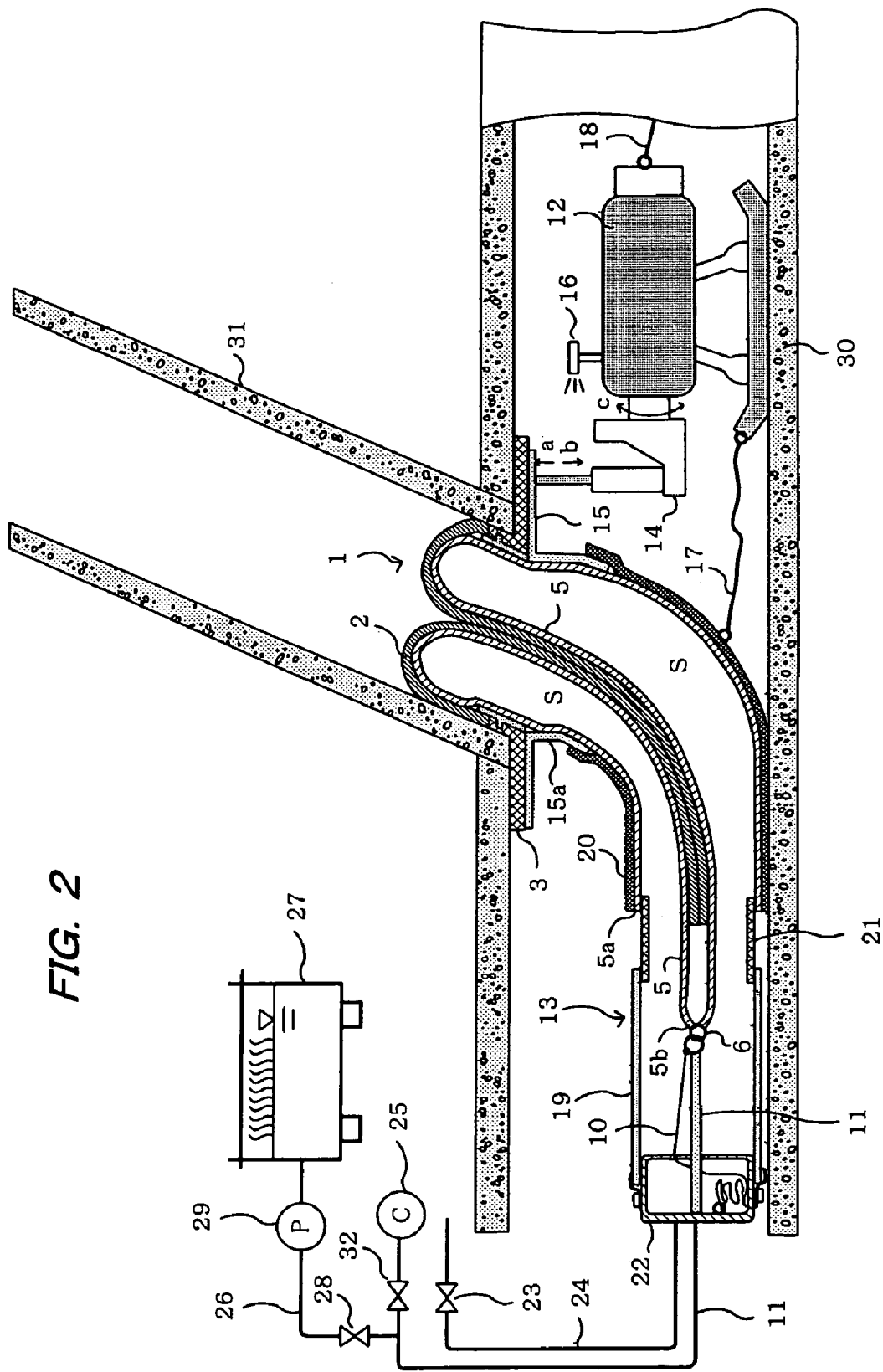
FIG. 2 is a cross sectional view that shows the lateral pipe lining method according to the present invention.

Incidentally, the flange 3 formed at one end of the tubular resin absorbing material 2 comprises a curved surface that arcuately curves with a curvature equal to a main pipe 30 (refer to FIG. 2), and the outer diameter thereof is set greater than the inner diameter of a lateral pipe 31 (refer to FIG. 2). The shape of the flange 3 is held by curing the impregnated setting resin therein.

In addition, a sealing tube (inner liner) 5 of a prescribed length is detachably (removably) attached to the outer circumferential surface of the tubular resin absorbing material 2 such that it entirely wraps the tubular resin absorbing material 2. One end 5a of this sealing tube 5 is open, projects from the flange 3 of the tubular resin absorbing material 2, and extends to the vicinity of the pressure bag, as discussed later. The other end 5b of the sealing tube 5 is sealed airtightly, and is coupled to a pulling rope 10 via a coupler 6.

Accordingly, the sealing tube 5 is a bag shaped, long, thin tubular member, and the tubular resin absorbing material 2 is inserted and housed in the sealing tube 5 so that the substantial entirety of the tubular resin absorbing material 2 is wrapped by the sealing tube 5.

A material the same as the plastic film 4 is selected for the material of the sealing tube 5. In addition, a metal collar 7 is attached to the flange part to enhance the coupling between the flange 3 and the tubular resin absorbing material 2, and to protect the tubular resin absorbing material 2.

To reliably attach the sealing tube 5 to the tubular resin absorbing material 2, part of the lateral pipe lining material 1 can be temporarily bonded or adhesively attached at, for example, a vicinity 5c of the flange 3.

Figure 5:
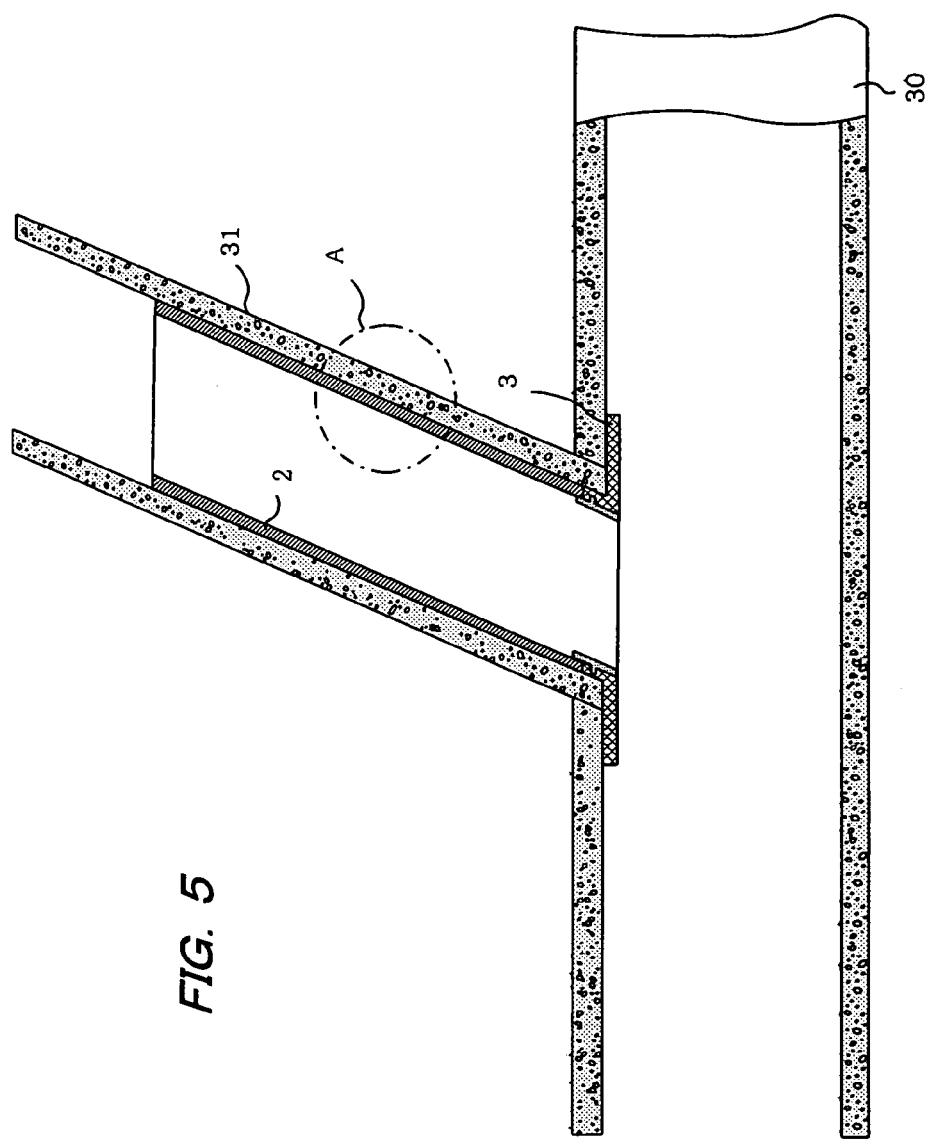
FIG. 5 is a cross sectional view that shows the lateral pipe lining method according to the present invention.
Figure 6:
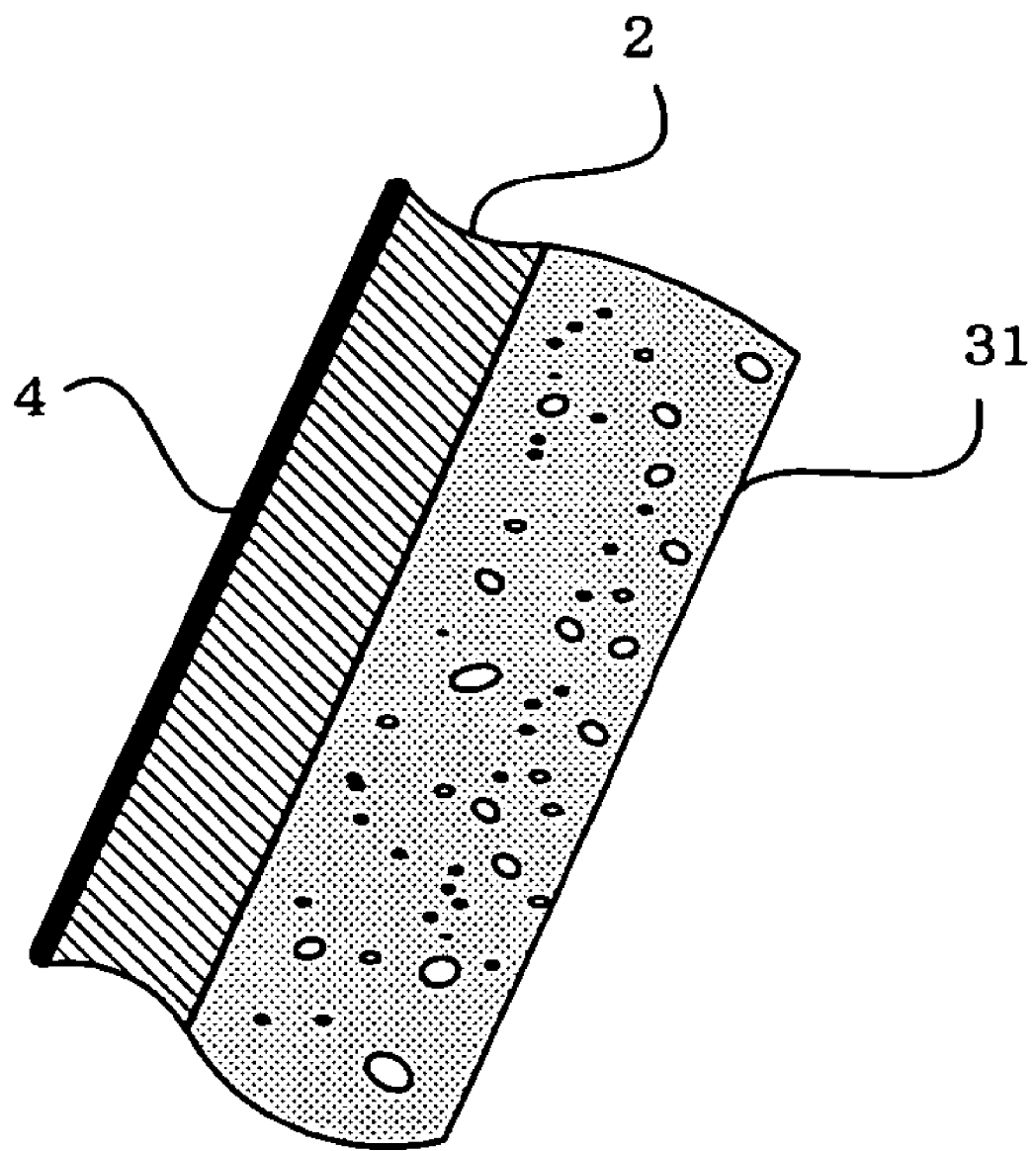
FIG. 6 is an enlarged detailed view of the A part in FIG. 5.

A lateral pipe lining method according to the present invention using the abovementioned lateral pipe lining material 1 will now be described, referring to FIG. 2 through FIG. 6. FIG. 2 through FIG. 5 are cross sectional views that show the sequence of the processes of a lateral pipe lining method according to the present invention, and FIG. 6 is an enlarged detailed view of the A part in FIG. 5.

In FIG. 2, 30 is a main pipe, such as a sewer pipe, and 31 is a small diameter lateral pipe that branches from the main pipe 30. A working robot 12, which was previously assembled and integrated aboveground, a pressure bag 13, the lateral pipe lining material 1, and the like, are drawn into the main pipe 30.

The working robot 12 is driven by hydraulic pressure, and a head 14 thereof reciprocates in the direction of the arrows a, b and rotates in the direction of the arrow c in FIG. 2, and a flange shaped setting nozzle 15 is supported by the head 14. In addition, a video camera 16 for monitoring is installed at the upper part of this working robot 12. Furthermore, pulling ropes 17, 18 are attached fore and aft of the working robot 12. One pulling rope 17 is connected to a tube 20 of the pressure bag 13, and the other pulling rope 18 is provided extending to the ground level.

The pressure bag 13 comprises two flexible tubes 19, that are joined by a cylindrical joint 21. A cap 22 blocks an opening end of one tube 19 airtightly, and an opening end of the other tube 20 is attached to a tubular part 15a of the setting nozzle 15.

The flange 3 of the lateral pipe lining material 1 is set on the setting nozzle 15, and the other uneverted portion (the portion excluding the flange 3 of the tubular resin absorbing material 2) passes through the setting nozzle 15 and is housed inside the pressure bag 13. The sealing tube 5 attached to the outer circumferential surface of the tubular resin absorbing material 2 is also housed inside the pressure bag 13, and the opening end 5a of the sealing tube 5 is folded outwardly and attached to the inner circumferential part (the outer circumference of the joint 21) of the tube 20 of the pressure bag 13.

It is to be noted that the opening end 5a of the sealing tube 5 is attached airtightly to the opening part (the opening end) of the airtight pressure bag 13, thereby forming an airtight sealed space S therein for everting the sealing tube 5 and the tubular resin absorbing material 2. As discussed later, if compressed air is supplied to this sealed space, then the tubular resin absorbing material 2 and the sealing tube 5 are inserted into the lateral pipe 31 while being everted.

In addition, one end of the pulling rope 10 is attached to the cap 22, an air and steam hose 11 is attached to the coupler 6, and the air and steam hose 11 passes through the cap 22 and extends outward out of the pressure bag 13. In addition, an air bleeding hose 24 extends outward from the cap 22 (the air bleeding hose inside the pressure bag is not shown), and a valve 23 is attached to the end part thereof.

The airtight sealed space S is formed by the space inside the pressure bag 13 and the space enclosed by the sealing tube 5, and the sealed space S is connected to a compressor 25, installed aboveground, via the air and steam hose 11 attached to the cap 22, and is also connected to a steam tank 27 via a steam hose 26 that branches from the air and steam hose 11. Furthermore, a valve 28 and a steam pump 29 are connected to midway points of the steam hose 26, and a valve 32 is connected to the air and steam hose 11.

In the description above, the pulling of the pulling rope 18 or the pressure bag 13 (the air and steam hose 11) integrally moves the working robot 12, the lateral pipe lining material 1 (including the sealing tube 5) supported thereby, the pressure bag 13, and the like, inside the main pipe 30. While monitoring the main pipe 30 via the video camera 16, the flange 3 of the lateral pipe lining material 1 is positioned at the opening part of the lateral pipe 31, the head 14 of the working robot 12 is moved in the arrow a direction, and the flange 3 of the lateral pipe lining material 1 is pressed to, and thereby brought into tight contact with the circumferential edge wall of the lateral pipe opening of the main pipe 30 (the portion where the lateral pipe 31 opens to the main pipe 30), as shown in FIG. 2.

Figure 3:
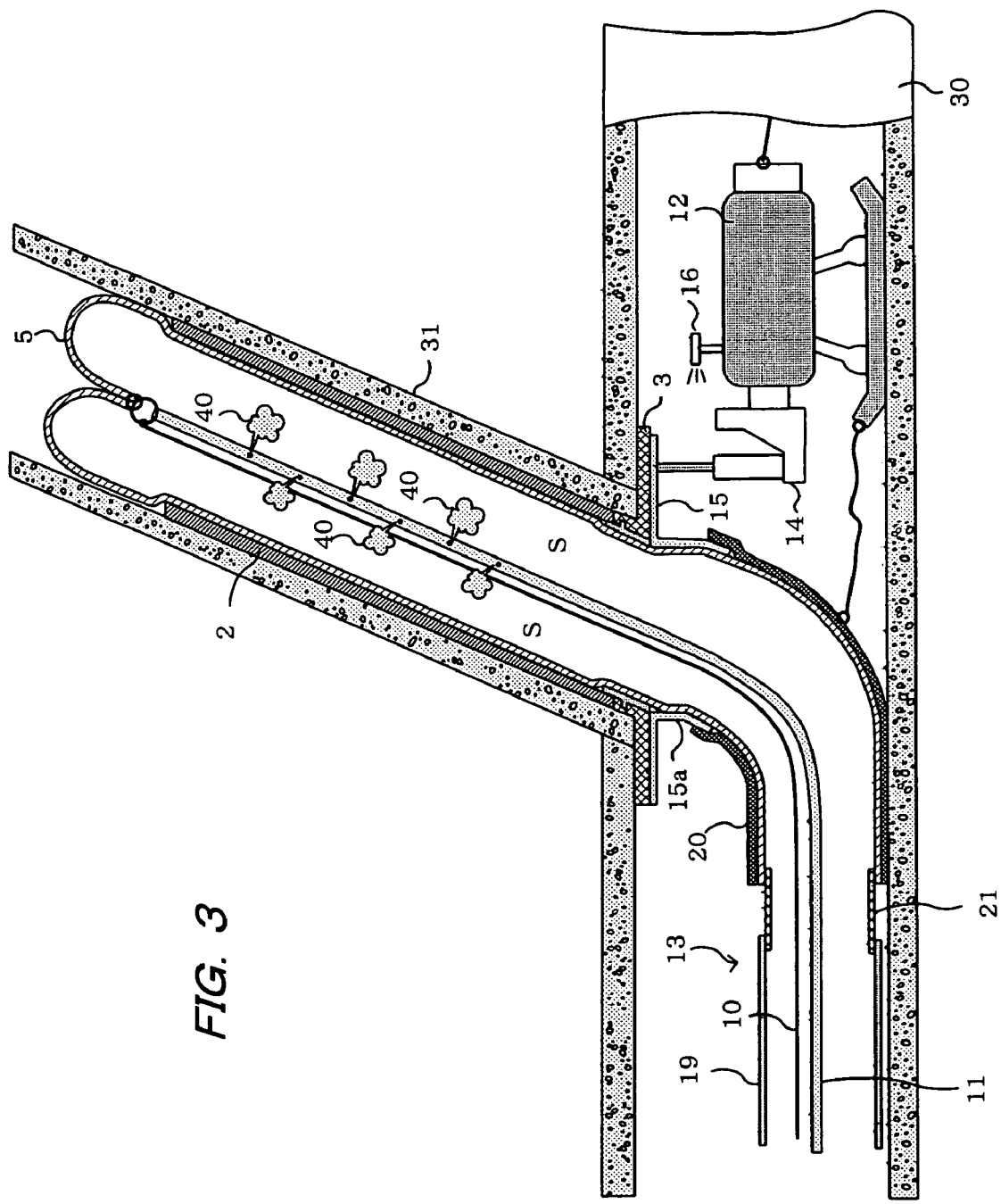
FIG. 3 is a cross sectional view that shows the lateral pipe lining method according to the present invention.

Next, the compressor 25 is driven with the valves 23, 28 closed and the valve 32 open to supply compressed air to the sealed space S inside the pressure bag 13 via the air and steam hose 11. This causes the tubular resin absorbing material 2 and the sealing tube 5 to receive the pressure of the compressed air and to be successively inserted, while being everted, from the main pipe 30 into the lateral pipe 31 toward the ground level (above), as shown in FIG. 3. It is to be noted that, at this time, the sealing tube 5 seals the space S airtightly.

The length of the tubular resin absorbing material 2 of the lateral pipe lining material 1 is set shorter than the length of the lateral pipe 31, and, when the eversion and insertion of the lateral pipe lining material 1 inside the lateral pipe 31 is finished, as shown in FIG. 3, the tubular resin absorbing material 2 of the lateral pipe lining material 1 is pressed against the inner circumferential wall of part of the lateral pipe 31 (a portion of a prescribed length from the main pipe 30). The sealing tube 5 is also everted at this time as shown in the figure, and the entire tubular resin absorbing material 2 is more evenly pressed against the lateral pipe inner wall surface by the everted sealing tube 5.

The steam pump 29 is then driven with the valve 32 closed and the valves 23, 28 open to supply steam inside the sealed space S via the steam hose 26 and the air and steam hose 11. The compressed air inside the sealed space S is partially discharged into the atmosphere via the air bleeding hose 24, and, in a state wherein the lateral pipe lining material 1 is kept to be pressed against the inner circumferential wall of the lateral pipe 31 as shown in FIG. 3, the lateral pipe lining material 1 is heated by misted steam (heat medium) 40 discharged from a plurality of apertures arranged along the axis of the air and steam hose 11. This causes the thermosetting resin impregnated in the tubular resin absorbing material 2 to be cured and part of the inner circumferential surface of the lateral pipe 31 to be partially lined and repaired by the cured tubular resin absorbing material 2.

Figure 4:
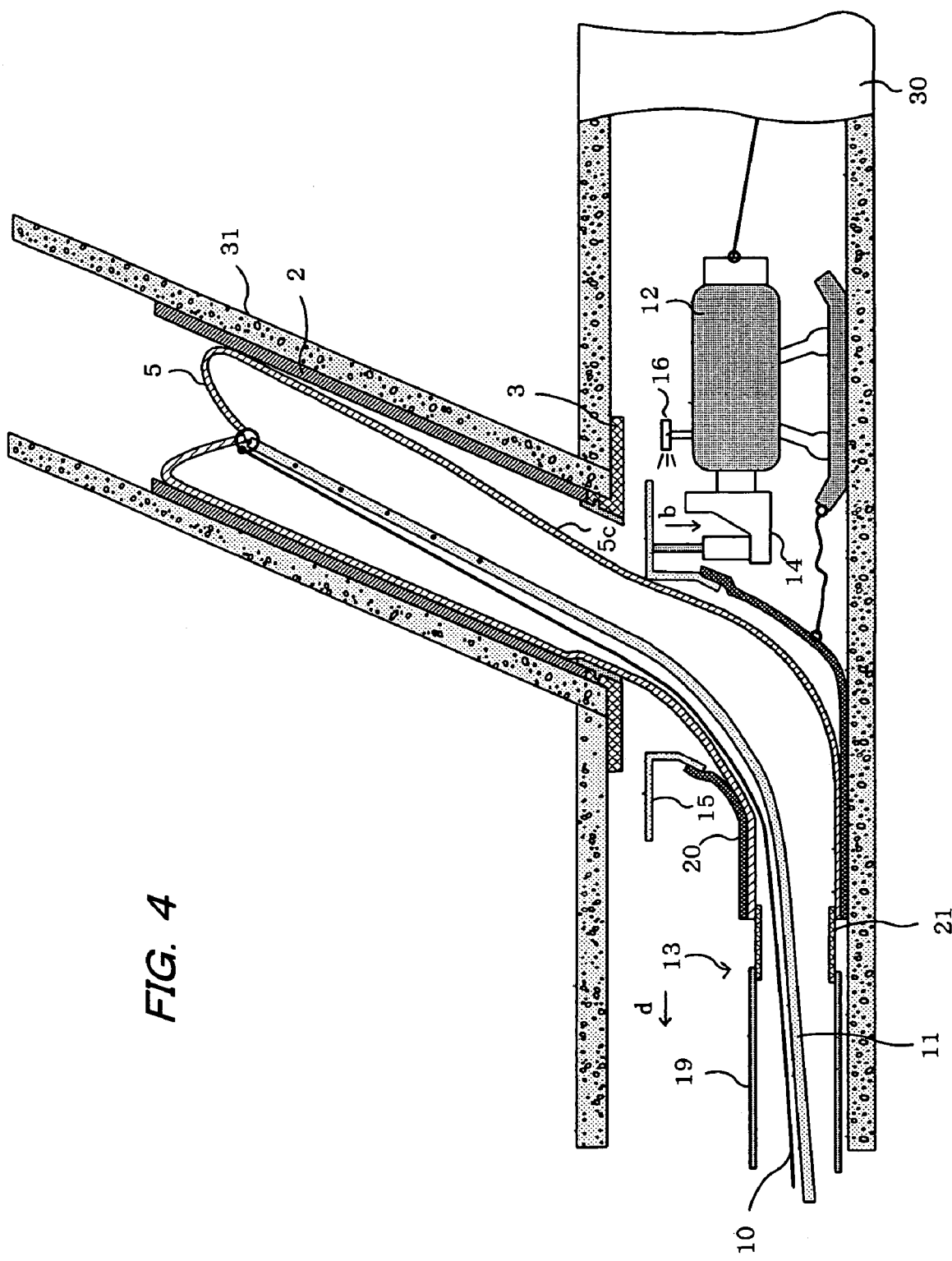
FIG. 4 is a cross sectional view that shows the lateral pipe lining method according to the present invention.

When the tubular resin absorbing material 2 of the lateral pipe lining material 1 hardens as discussed above, the steam is removed from the sealed space S, the head 14 of the working robot 12 is moved downward in the arrow b direction as shown in FIG. 4, the setting nozzle 15 is detached from the flange 3 of the lateral pipe lining material 1, and the air and steam hose 11, and the like, is subsequently pulled in the arrow d direction.

Thus, the pressure bag 13, the working robot 12 connected thereto via the pulling rope 17, and the sealing tube 5 attached to the joint 21 of the pressure bag 13 are pulled out from the inner circumferential surface of the tubular resin absorbing material 2.

If the sealing tube 5 is temporarily bonded at a part of the lateral pipe lining material 1, e.g., at the vicinity 5c of the flange 3, then the bonded portion 5c is peeled off from the tubular resin absorbing material 2 by this pulling force.

Accordingly, the air and steam hose 11, the working robot 12, the pressure bag 13, and the sealing tube 5 move integrally within the main pipe 30, and are removed from the interior of the main pipe 30. As shown in FIG. 5, the flange 3 and the tubular resin absorbing material 2 of the cured lateral pipe lining material 1 are left inside the lateral pipe 31, and the sequence of the work for lining the lateral pipe 31 is completed. As shown in detail in FIG. 6, it is understood that the inner wall of the lateral pipe 31, for which lining has been completed, is lined by the tubular resin absorbing material 2 coated with the plastic film 4.

As described above, the lateral pipe lining material 1 to whose outer circumferential surface the sealing tube 5 is attached across a prescribed length is everted and inserted by fluid pressure into the lateral pipe 31 from the main pipe 30 to the ground level, and, when the lateral pipe lining material 1 is cured, the sealing tube 5 can subsequently be easily removed. Therefore, there is no need to perform the work of cutting off the everted end of the lateral pipe lining material 1 on the ground level, and all work can be performed on the main pipe 30 side. This assures that the lateral pipe 31 can always be lined reliably, regardless of the circumstances aboveground.

In addition, because the opening end 5a of the sealing tube 5 is attached to the opening end of the pressure bag 13, an effect is also obtained wherein the space between the pressure bag 13 and the flange 3 is sealed by the sealing tube 5, eliminating the need for a sealing member (the peel off tube 5, and the like, as disclosed in Japanese Published Patent Application No. 1996-164560) conventionally needed to seal the space between the pressure bag 13 and the flange 3.

In the embodiment as mentioned above, the tubular resin absorbing material 2 of the lateral pipe lining material 1 is impregnated with a thermosetting resin. However, the tubular resin absorbing material 2 may be impregnated with a photosetting resin, or some other setting resin.

In addition, hot water, or a hot shower, instead of steam, can cure the everted tubular resin absorbing material 2.

Figure 7:
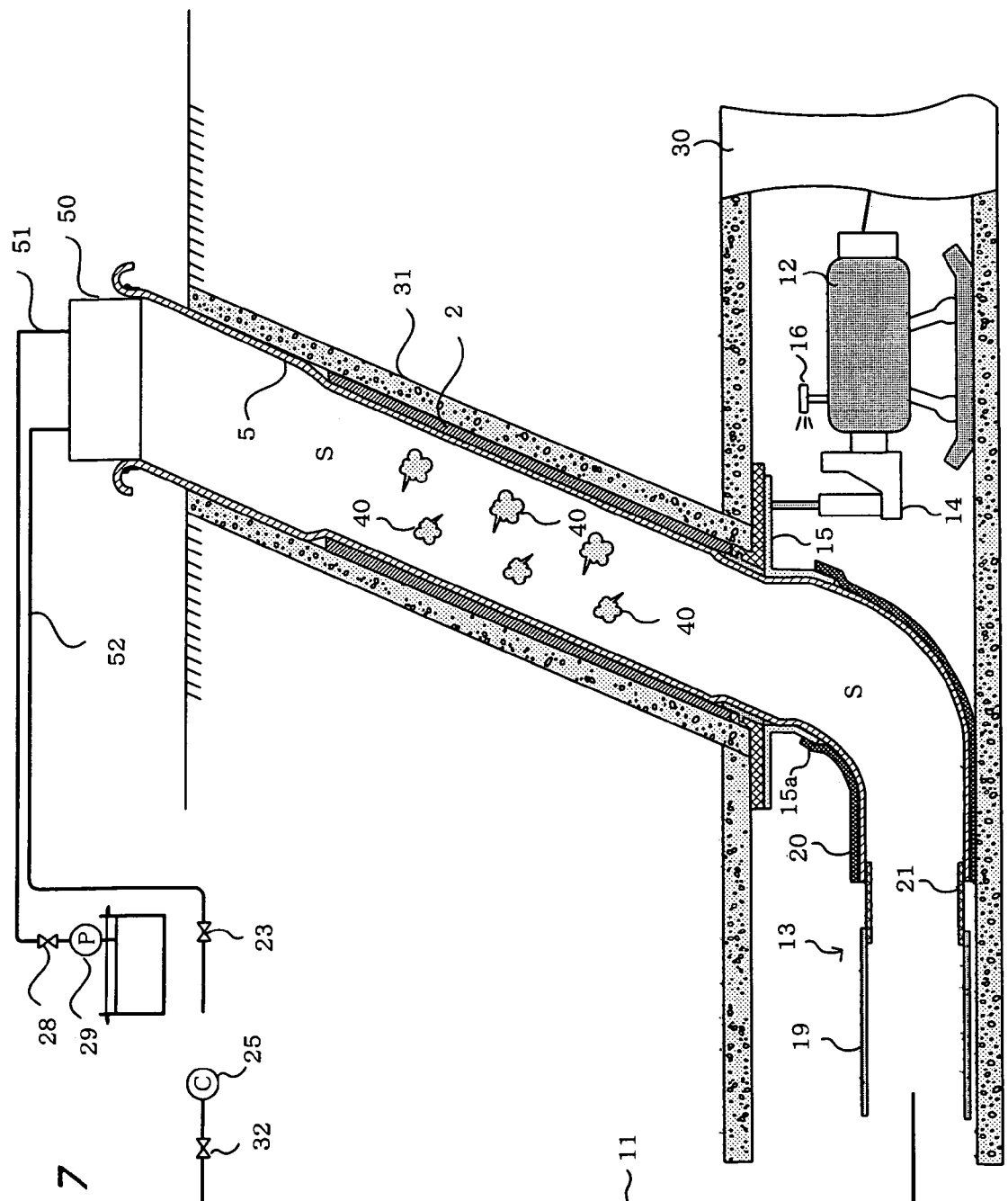
FIG. 7 is a cross sectional view that shows another embodiment of the lateral pipe lining method according to the present invention.
Figure 8:
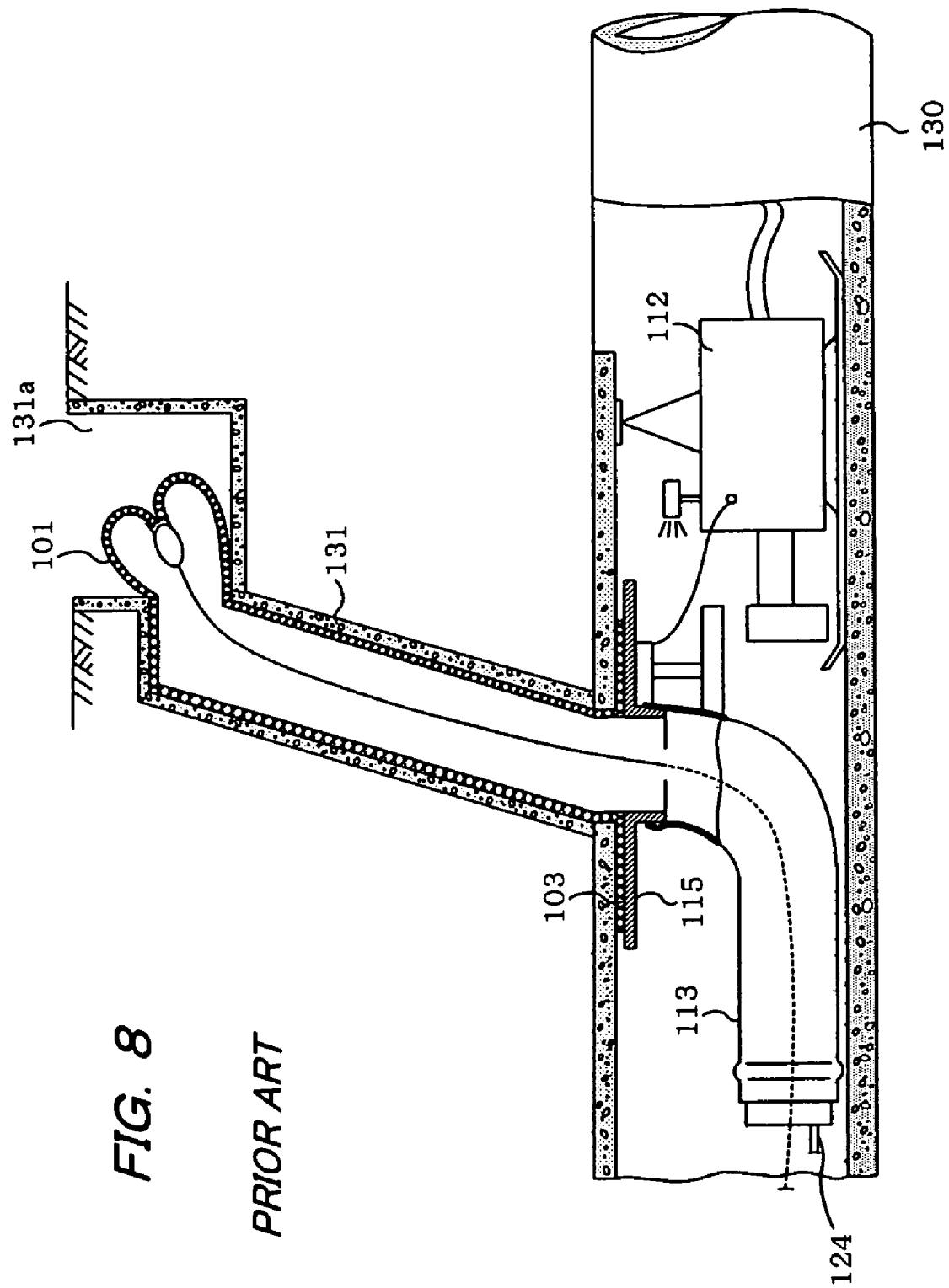
FIG. 8 is a cross sectional view that shows a conventional lateral pipe lining method.

The second embodiment shown in FIG. 7 is performed the same as the first embodiment up through the point of everting the lateral pipe lining material.

In the second embodiment, when the tubular resin absorbing material 2 is everted, the sealing tube 5 is further everted to the ground level and made to protrude, as shown in FIG. 7, a part of this protruding sealing tube 5 is cut off, and an attachment 50 is attached thereto from the aboveground side.

The steam pump 29 is then driven with the valve 32 closed and the valves 23, 28 open to supply steam inside the sealed space S via a steam hose 51. This causes the compressed air inside the sealed space S to be discharged into the atmosphere via an air bleeding hose 52. The lateral pipe lining material 1 is heated in a state wherein it is pressed against the inner circumferential wall of the lateral pipe 31, the thermosetting resin impregnated in the tubular resin absorbing material 2 is cured, and part of the inner circumferential surface of the lateral pipe 31 is partially lined and repaired by the cured tubular resin absorbing material 2.

The same as in the first embodiment, hot water, or a hot shower, instead of steam, can cure the everted tubular resin absorbing material 2.

What is claimed is:

1. A method for lining a lateral pipe using a lateral pipe lining material made of a tubular resin absorbing material impregnated with a setting resin, which has a flange at one end thereof and whose outer surface is coated with a highly airtight film, comprising the steps of:

detachably attaching a sealing tube to an outer circumferential surface of said tubular resin absorbing material, said sealing tube being longer than the overall length of the tubular resin absorbing material, with one end of the sealing tube on a side opposite the flange of the tubular resin absorbing material being closed, and with the other end of the sealing tube on a flange side extending longer than the flange and forming an open end;

introducing inside a main pipe said lateral pipe lining material with the open end of said sealing tube being attached to a pressure bag for everting the lateral pipe lining material and with a pulling rope and a hose, which is provided with a plurality of apertures arranged in a hose axis direction, being attached to the closed end of said sealing tube;

bringing the flange of said lateral pipe lining material into tight contact with a lateral pipe opening at the main pipe;

everting the lateral pipe lining material together with the sealing tube by supplying fluid pressure to the pressure bag through said hose for insertion into the lateral pipe from the main pipe toward the ground level;

maintaining a state wherein the lateral pipe lining material is pressed against the inner circumferential surface of the lateral pipe;

supplying a heat medium through the apertures of said hose to cure the setting resin impregnated in the lateral pipe line material; and after curing is completed, removing said sealing tube from the lateral pipe lining material using said pulling rope attached to the closed end of the sealing tube.

2. A method as set forth in claim 1, wherein:

the heat medium is steam; and the steam is discharged via the apertures of said hose.

3. A method as set forth in claim 1, wherein said sealing tube is temporarily bonded at a part of the lateral pipe lining material.

* * * * *

UNITED STATES PATENT AND TRADEMARK OFFICE
CERTIFICATE OF CORRECTION

| | |
|---|---|
| PATENT NO. | : 7,311,121 B2 |
| APPLICATION NO. | : 11/261167 |
| DATED | : December 25, 2007 |
| INVENTOR(S) | : Kamiyama et al. |

It is certified that error appears in the above-identified patent and that said Letters Patent is hereby corrected as shown below:

In the Specification:

In column 4, line 58, the phrase "tubes 19, that", should read --tubes 19, 20 that--.

Signed and Sealed this

Twenty-ninth Day of July, 2008

JON W. DUDAS
*Director of the United States Patent and Trademark Office*